United States Patent
Roh et al.

(10) Patent No.: US 7,916,719 B2
(45) Date of Patent: Mar. 29, 2011

(54) APPARATUS AND METHOD FOR CONTROLLING HYBRID ARQ MEMORY IN BROADBAND WIRELESS ACCESS COMMUNICATION SYSTEM

(75) Inventors: Jin-Woo Roh, Suwon-si (KR); Ji-Yun Seol, Seongnam-si (KR); Bong-Gee Song, Seongnam-si (KR); Jong-Han Lim, Seoul (KR); Jung-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 11/769,992

(22) Filed: Jun. 28, 2007

(65) Prior Publication Data

US 2008/0002629 A1 Jan. 3, 2008

(30) Foreign Application Priority Data

Jun. 29, 2006 (KR) .................. 10-2006-0059683

(51) Int. Cl.
*H04L 12/50* (2006.01)

(52) U.S. Cl. .......... 370/363; 370/381; 370/395.71; 714/18; 711/111; 711/209

(58) Field of Classification Search .......... 370/230, 370/235, 236, 310, 328, 329, 338, 381–383, 370/341, 363, 395.71; 455/67.13, 69, 403, 455/550.1, 556.2, 418–420, 452, 451, 514, 455/549; 517/63.1; 714/18, 20, 25, 29, 42, 714/47, 48, 54, 746–750; 711/3, 5, 108, 711/109, 111, 113, 114, 129, 173, 209, 211

See application file for complete search history.

(56) References Cited

U.S. PATENT DOCUMENTS

| 5,715,257 A | 2/1998 | Matsuki et al. |
|---|---|---|
| 6,700,867 B2 * | 3/2004 | Classon et al. .............. 370/216 |
| 2004/0190552 A1 * | 9/2004 | Kim et al. .................. 370/469 |
| 2005/0152350 A1 * | 7/2005 | Sung et al. .................. 370/376 |
| 2005/0201283 A1 * | 9/2005 | Yoon et al. .................. 370/232 |
| 2006/0227811 A1 * | 10/2006 | Hussain et al. ............ 370/503 |

FOREIGN PATENT DOCUMENTS

| JP | 01995-038540 A | 2/1995 |
|---|---|---|
| JP | 1999-355254 A | 12/1999 |
| KR | 1020020019334 A | 3/2002 |
| KR | 1020030021434 A | 3/2003 |
| KR | 1020060110107 A | 10/2006 |

* cited by examiner

*Primary Examiner* — Kent Chang
*Assistant Examiner* — San Htun
(74) *Attorney, Agent, or Firm* — Roylance, Abrams, Berdo and Goodman L.L.P.

(57) ABSTRACT

A method and HARQ memory apparatus in a BWA communication system are provided where the HARQ memory apparatus includes a memory configured to partition the entire memory area in units of slots corresponding to the size of a concatenation block, to input/output a plurality of channel data to the slot in units of the concatenation block, to store a new concatenation block in an empty slot, and to combine a retransmitted concatenation block with a prestored concatenation block and store the combined concatenation block at a prestored location. Accordingly, the required amount of memory can be reduced by using a buffer efficiently. In particular, when a memory is embedded in an integrated circuit, the size and power consumption of the integrated circuit can be reduced.

25 Claims, 8 Drawing Sheets

ACID_CIR | 0 | 0 | 1 | 0 | 1 | 1 | 1 | 0 | 0 | 1 | 0 | 1 | 0 | 1 | 0 | 0 |

FIG.7

APPARATUS AND METHOD FOR CONTROLLING HYBRID ARQ MEMORY IN BROADBAND WIRELESS ACCESS COMMUNICATION SYSTEM

PRIORITY

This application claims benefit under 35 U.S.C. §119(a) of a Korean Application No. 2006-59683 filed on Jun. 29, 2006 filed in the Korean Intellectual Property Office and allocated Serial, the entire disclosure of which is incorporated herein by reference.

BACKGROUND OF THE INVENTION

1. Field of the Invention

The present invention relates to a broadband wireless access (BWA) communication system. More particularly, the present invention relates to an apparatus and method for reducing the required amount of memory by using a memory efficiently when using a hybrid ARQ (HARQ) scheme for increasing the reliability of data transmission.

2. Description of the Related Art

Extensive research is being conducted to provide various Quality of Service (QoS) features with a data rate of about 100 Mbps in the advanced fourth-generation (4G) communication system. The 4G communication system is evolving to provide mobility, high data rate transmission, and high QoS in a BWA communication system such as a wireless local area network (WLAN) system and a wireless metropolitan area network (WMAN) system. Typical examples of the above system are identified in the Institute of Electrical and Electronics Engineers (IEEE) 802.16d system and the IEEE 802.16e system standards. WiMAX or WiBro uses the communication technologies of IEEE 802.16d and IEEE 802.16e.

The IEEE 802.16d system and the IEEE 802.16e system use an Orthogonal Frequency Division Multiplexing (OFDM)/Orthogonal Frequency Division Multiple Access (OFDMA) scheme to provide a broadband transmission network for a physical channel of the WMAN system. The IEEE 802.16d system considers only a fixed subscriber station (SS) and a single cell structure (for example, the mobility of an SS is not considered). The IEEE 802.16e system considers the mobility of an SS. When the mobility of an SS is considered, the SS will be referred to as a mobile station (MS). Hereinafter, an SS and an MS will be collectively referred to as 'user equipment (UE)'.

Because a signaling communication between a base station (BS) and a UE is performed through a direct link, the general IEEE 802.16e system can easily provide a highly reliable wireless link between the BS and the UE. However, because the BS is stationary, the IEEE 802.16e system has a low flexibility in constructing a wireless network. Accordingly, the IEEE 802.16e system makes it difficult to provide an efficient communication service in a radio environment where traffic distribution or call requirements change frequently. In order to overcome this problem, a stationary relay station (RS), a mobile RS or general UEs can be used to apply a multi-hop relay data transmission scheme to a general cellular communication system such as the IEEE 802.16e system. The use of the multi-hop relay scheme can expand a coverage area of the BS.

FIG. 1 is a schematic block diagram of the IEEE 802.16e system that is a general BWA communication system.

Referring to FIG. 1, the IEEE 802.16e system has a multi-cell structure. The IEEE 802.16e system includes a cell 100, a cell 150, a BS 110 managing the cell 100, a BS 140 managing the cell 150, and a plurality of UEs 111, 113, 130, 151 and 153. The signal exchange between the BSs 110 and 140 and the UEs 111, 113, 130, 151 and 153 is performed using the OFDM/OFDMA scheme. When the UE 130 is located in a boundary region (for example, a handover region) between the cells 100 and 150, it may perform a handover due to its moving direction or other reasons. That is, when the UE 130 moves from the cell 100 of the BS 110 into the cell 150 of the BS 140 while communicating with the BS 110, the serving BS of the UE 130 is changed from the BS 110 to the BS 140.

In order to increase the reliability of data transmission, an HARQ scheme is used to perform data transmission between the BS and the LTE in the BWA communication system.

The HARQ scheme performs error detection on data received by a receiver, and transmits an ACKnowledgement (ACK) signal or a Negative ACKnowledgement (NACK) signal to a transmitter according to the error detection results. For example, if there is an error in the data, the transmitter retransmits the data to the receiver. Upon receipt of the retransmitted data from the transmitter, the receiver combines the retransmitted data and the previously-received data, thereby increasing the reliability of data transmission.

In order to combine the retransmitted data and the previously-received data, the receiver needs a memory for storing the previously-received data.

An HARQ scheme in a WiMAX profile defines four-level parameters depending on the buffer capacity. Table 1 shows the memory sizes required at the respective levels.

TABLE 1

| Downlink Level | Aggregation | Memory Size |
|---|---|---|
| 1 | OFF | 16,384 bits × 4 (LLR bits) × 4 channels = 262,144 bits |
| 2 | ON | 8,192 bits × 16 channels × 4 (LLR bits) × 16 channels = 8,388,608 bits |
| 3 | ON | 16,384 bits × 16 channels × 4 (LLR bits) × 16 channels = 167,77216 bits |
| 4 | ON | 23,170 bits × 16 channels × 4 (LLR bits) × 16 channels = 23,726,080 bits |

Referring to Table 1, an aggregation at a Level 1 is basically off, while aggregations at Levels 2, 3 and 4 are basically on.

In Table 1, the log likelihood ratio (LLR) bit denotes the resolution of bits indicating a data symbol in a receiver, which is an implementation-dependent value. In general, the LLR bit has a bit resolution of about 4~10 bits.

In Table 1, the bit resolution is assumed to be 4 bits, in order to illustrate a relative value at each level and a buffer size at each level in the HARQ scheme. A memory of the total memory size is required for each ARQ channel ID (ACID) in order to support the aggregation. The ACID indicates an input data channel.

If the aggregation is on, a downlink (DL) burst with a size corresponding to the total channel capacity (for example, 16 channels for Level 3) can be transmitted to one ACID. That is, if the aggregation in Level 3 is on, a memory with a size of 16 bits is required.

Thus, if the aggregation is on, a buffer with a memory size defined in Table 1 is required for each level. What is therefore required is an apparatus and method for managing the buffer efficiently.

SUMMARY OF THE INVENTION

An object of exemplary embodiments of the present invention is to substantially solve at least the above problems and/or disadvantages and to provide at least the advantages below. Accordingly, an object of exemplary embodiments of the present invention is to provide an apparatus and method for controlling an HARQ memory in a BWA communication system.

Another object of exemplary embodiments of the present invention is to provide an apparatus and method for managing a buffer efficiently by partitioning the buffer in units of concatenation block.

Still another object of exemplary embodiments of the present invention is to provide an apparatus and method for reducing the required amount of memory by using a buffer efficiently.

According to one aspect of exemplary embodiments of the present invention, an HARQ memory apparatus in a BWA communication system includes a memory configured to partition the entire memory area in units of slots corresponding to the size of a concatenation block, to input/output a plurality of channel data to the slot in units of the concatenation block, to store a new concatenation block in an empty slot, and to combine a retransmitted concatenation block with a pre-stored concatenation block and store the combined concatenation block at a pre-stored location.

According to another aspect of exemplary embodiments of the present invention, a method for controlling an HARQ memory apparatus in a BWA communication system includes the steps of partitioning the entire memory area in units of slots corresponding to the size of a concatenation block, inputting a plurality of channel data in units of the concatenation block, determining if a concatenation block of the input channel data is a retransmitted block or a newly-transmitted concatenation block; if the concatenation block of the input channel data is a retransmitted concatenation block, combining the retransmitted concatenation block with a pre-stored concatenation block identical to the concatenation block of the input channel data and storing the combined concatenation block at a pre-stored location, and if the concatenation block of the input channel data is a newly-transmitted concatenation block, storing the concatenation block in an empty slot.

BRIEF DESCRIPTION OF THE DRAWINGS

The above and other exemplary objects, features and advantages of certain exemplary embodiments of the present invention will become more apparent from the following detailed description of certain exemplary embodiments thereof when taken in conjunction with the accompanying drawings in which:

FIG. 3 is a block diagram of an internal memory according to an exemplary embodiment of the;

FIG. 7 illustrates slot bitmap clear conditions according to an exemplary embodiment of the present invention.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Exemplary embodiments of present invention intend to provide an apparatus and method for controlling an HARQ memory in a BWA communication system.

Although the following description exemplifies the BWA communication system, exemplary embodiments of the present invention can be similarly applied to any communication system that uses an HARQ scheme.

Figure 1:
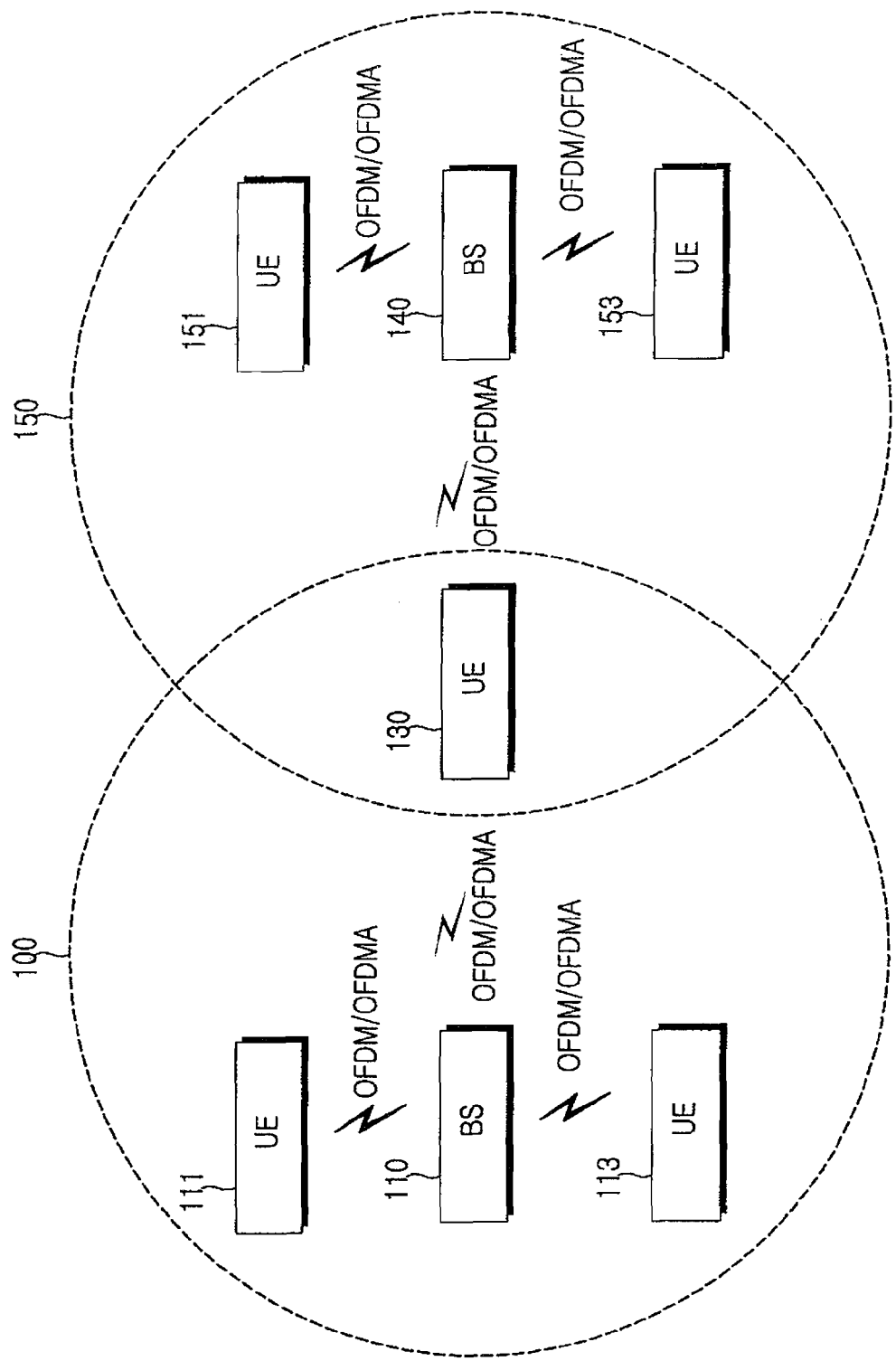
FIG. 1 is a schematic block diagram of a general BWA communication system.
Figure 2:
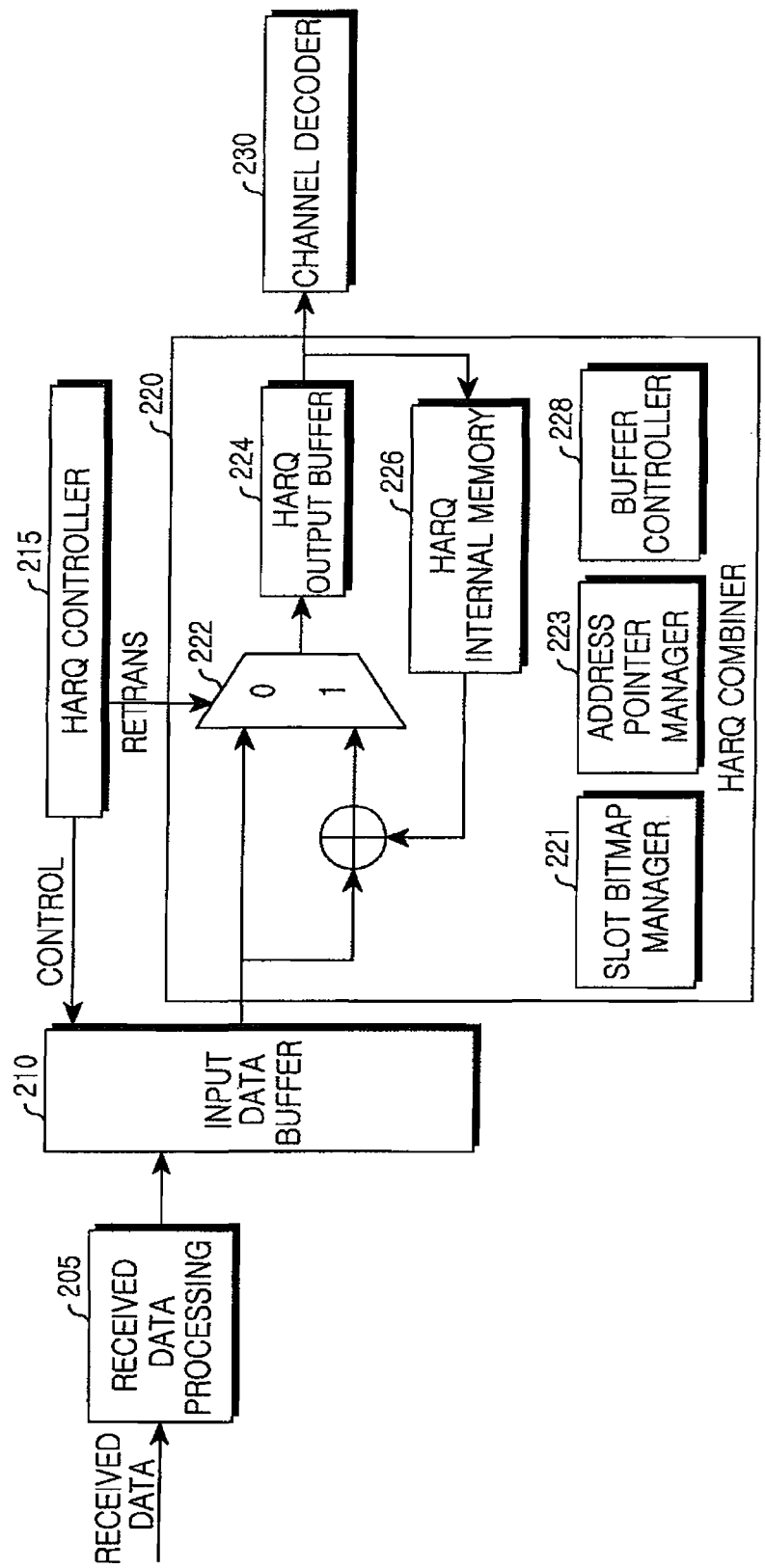
FIG. 2 is a block diagram of an HARQ memory control apparatus according to an exemplary embodiment of the present invention.

FIG. 2 is a block diagram of an HARQ memory control apparatus according to an exemplary embodiment of the present invention.

Referring to FIG. 2, an RX data processor 205 performs analog-to-digital conversion, cycle prefix (CP) removal, parallel-to-serial conversion, channel estimation, and demodulation on data received through an antenna. An input data buffer 210 temporarily stores data received from the RX data processor 205.

The HARQ controller 215 provides a control signal to the input data buffer 210 in units of concatenation block so that the input data buffer 210 outputs data. The concatenation block denotes a unit block that is decoded by a channel decoder 230. In addition, the HARQ controller 215 provides an HARQ combiner 220 with retransmission/new transmission data and ACID (ARQ channel ID) data about the current concatenation block.

In case of new transmission data, the HARQ combiner 220 stores received data of the concatenation block size in an HARQ internal memory 226. In case of retransmission data, the HARQ combiner 220 combines received data and data stored in the HARQ internal memory 226, and temporarily stores the combined data in an HARQ output buffer 224.

For example, the size of the HARQ output buffer 224 is 3,840 bits corresponding to the largest concatenation block size in Table 2. The combined data in the HARQ output buffer 224 are provided to the channel decoder 230 and also stored in the HARQ internal memory 226.

TABLE 2

| MCS Level | j (Slot) | Concatenation Block Size |
|---|---|---|
| QPSK ½ | 10 | 960 × 4 (LLR) = 3,840 bits (120 words) |
| QPSK ¾ | 6 | 576 × 4 (LLR) = 2,304 bits (72 words) |
| 16QAM ½ | 5 | 960 × 4 (LLR) = 3,840 bits (120 words) |
| 16QAM ¾ | 3 | 576 × 4 (LLR) = 2,304 bits (72 words) |
| 64QAM ½ | 3 | 864 × 4 (LLR) = 3,456 bits (108 words) |
| 64QAM ⅔ | 2 | 576 × 4 (LLR) = 2,304 bits (72 words) |
| 64QAM ¾ | 2 | 576 × 4 (LLR) = 2,304 bits (72 words) |
| 64QAM ⅚ | 2 | 576 × 4 (LLR) = 2,304 bits (72 words) |

Table 2 shows the number of slots of the WiMAX system for each modulation and coding scheme (MCS) level and the corresponding concatenation block size.

When the HARQ internal memory 226 is a dual-port memory, the combined data can be stored in the HARQ internal memory 226 simultaneously with data loading. In this case, an implementation can be made without the use of the HARQ output buffer 224. According to exemplary embodiments of the present invention, the HARQ internal memory 226 is assumed to be not a dual-port memory but a single-port memory.

When a memory partition is made for management of the HARQ internal memory 226, the HARQ controller 215 and the HARQ combiner 220 operate in units of concatenation block (i.e., channel decoding block). In this case, the HARQ internal memory 226 is partitioned in units of block larger than the concatenation block.

Although exemplary embodiments of the present invention will be described in terms of WiMAX profile level 3 (for example, the memory size is 1 megabit (Mbit)), it can be applied to other levels.

A slot bitmap manager 221 partitions and manages the HARQ internal memory 226 in units of bank or slot, which will be described below. An address pointer manager 223 calculates and controls memory address pointers that are used by the slot bitmap manager 221 to manage the HARQ internal memory 226.

A buffer controller 228 controls the overall operation of the HARQ combiner 220, and participates in all operations for storing and outputting concatenation blocks received under the control of the HARQ controller 215. A multiplexer 222 selects a combined output and a general output under the control of the HARQ controller 215.

Figure 3:
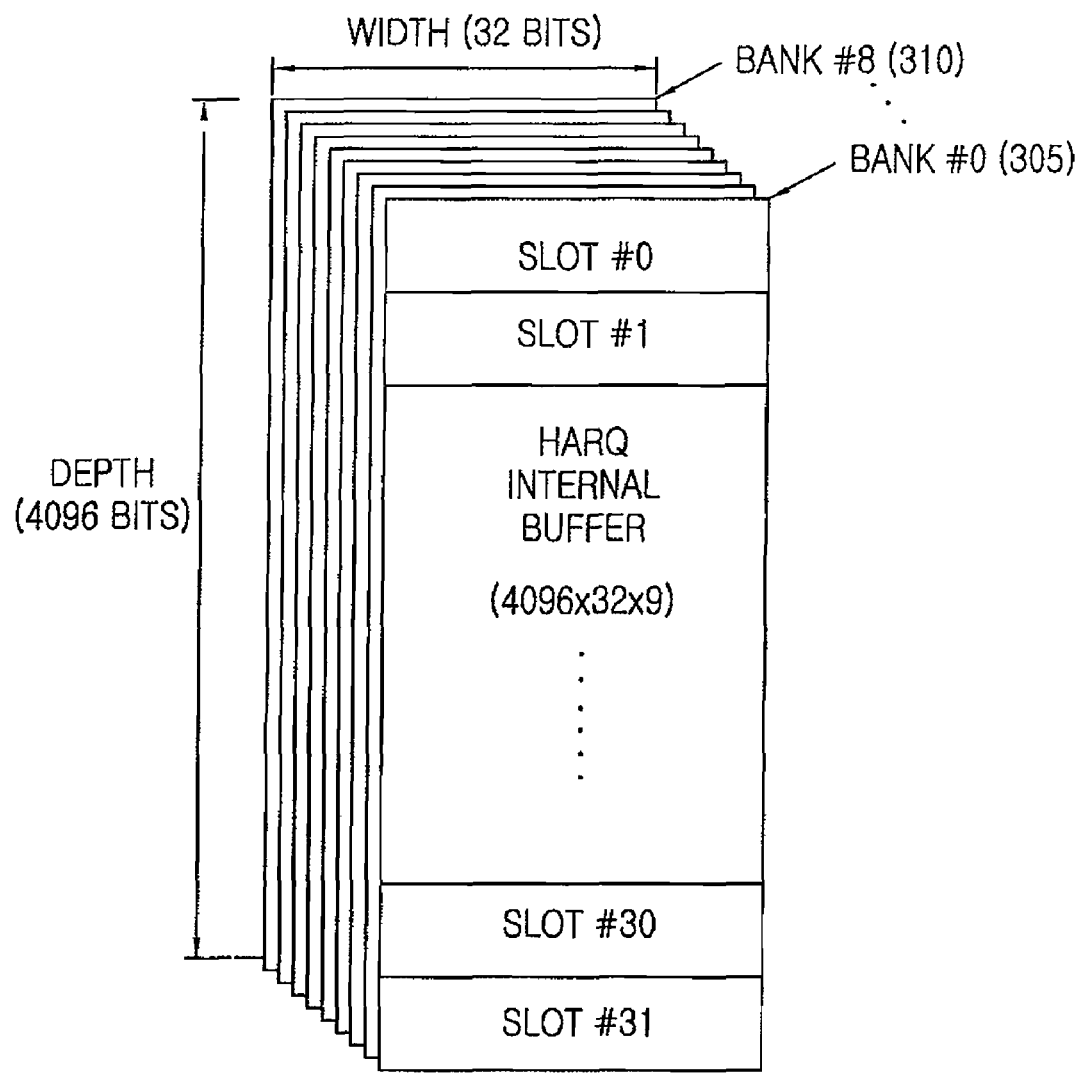

FIG. 3 is a block diagram of the HARQ internal memory 226 according to an exemplary embodiment of the present invention.

Referring to FIG. 3, because the size of a concatenation block in Table 2 is 2,304~3,840 bits, a 4,096-bit unit is partitioned as one memory block. Hereinafter, a 4,096-bit memory block will be referred to as 'slot'.

For example, 9 memory blocks each having a depth of 4,096 bits and a width of 32 bits are used in exemplary embodiments of the present invention. Hereinafter, a memory block having a depth of 4,096 bits and a width of 32 bits will be referred to as 'bank'.

Thus, for example, 9 banks are used in exemplary embodiments of the present invention. For example, 32 slots are allocated to one bank and thus the total number of slots is 288. A slot number is allocated to each slot. For example, a slot #0 to a slot #31 are allocated in the first band 'bank #0', a slot #32 to a slot #63 are allocated in the second band 'bank #1', . . . , a slot #256 to a slot #287 are allocated in the last band 'bank #8'. Data are stored in slots of a bank as illustrated in FIG. 4.

Figure 4:
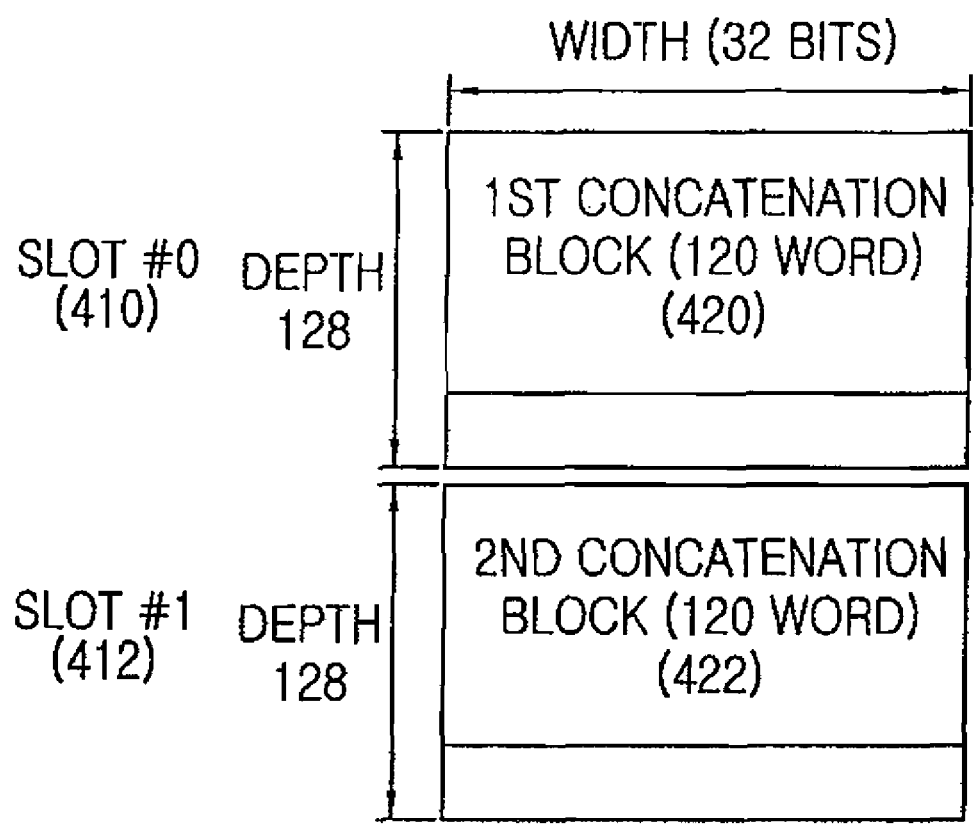
FIG. 4 illustrates the storage conditions of concatenation blocks according to an exemplary embodiment of the present invention.

FIG. 4 illustrates the storage conditions of concatenation blocks according to an exemplary embodiment of the present invention.

Referring to FIG. 4, if the size of a concatenation block is 3,840 bits (for example, 120 words), the first concatenation block 420 is stored in the first slot 410 and 8 words are empty in the first slot 410. The second concatenation block 422 is consecutively stored in the first slot 410 and the second slot 412. That is, the first 8 words of the second concatenation block 422 are stored in the first slot 410 and the remaining 112 words of the second concatenation block 422 are stored in the second slot 412.

The reason why not 8 but 9 banks are used when the memory size is 1 Mbit is that the concatenation block size is not precisely equal to the slot size. This is because when 10 concatenation blocks are allocated to the received data, there is an empty space in a slot that is allocated the last (for example, tenth) block.

A slot bitmap is used to indicate whether there is the current data in a predetermined slot. The slot bitmap is managed by the slot bitmap manager 221.

Figure 5:
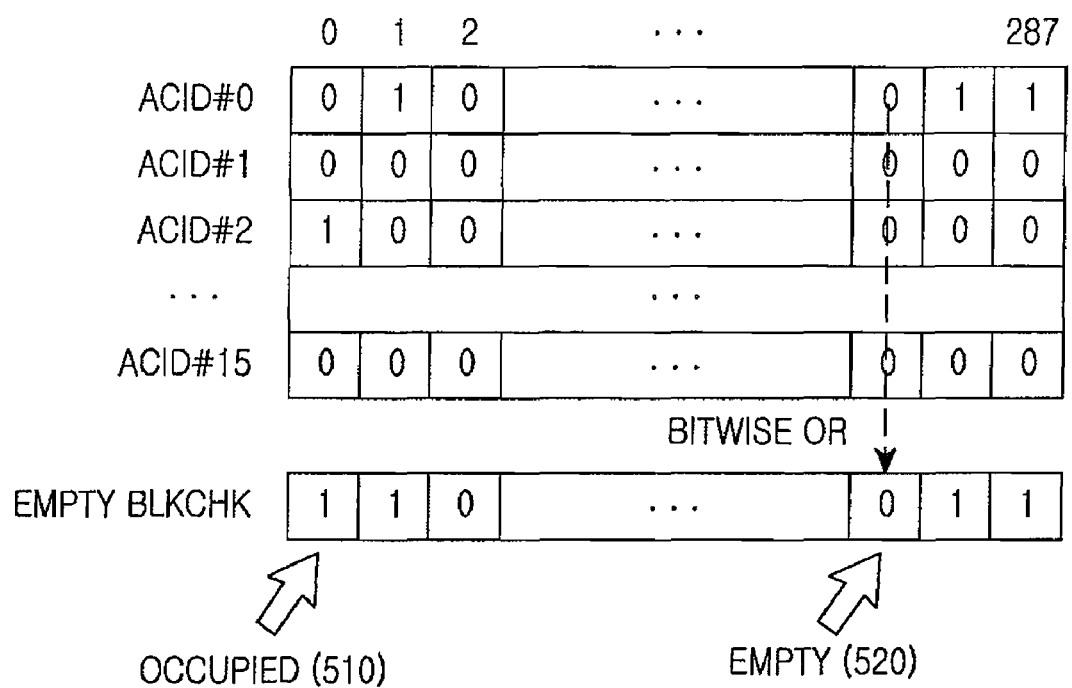
FIG. 5 illustrates a slot bitmap according to an exemplary embodiment of the present invention.

FIG. 5 illustrates a slot bitmap according to an exemplary embodiment of the present invention.

Referring to FIG. 5, an ACID denotes a channel, and numerals 0~287 denote slot numbers. That is, there are 9 banks and 288 slots in each channel.

The slot bitmap has a value of '0' or '1'. The slot bitmap '0' indicates that the corresponding slot is empty, while the slot bitmap '1' indicates that a concatenation block is stored in the corresponding slot. Thus, FIG. 5 shows that a concatenation block of an ACID #2 is stored in a slot #0, a concatenation block of an ACID #0 is stored in a slot #1, and a slot #2 is empty.

That is, an OR operation in units of column can reveals whether a concatenation block is stored in the current slot or not (for example, whether the current slot is occupied or empty). If an empty block check EmptyBlkChk is set to '1' (step 510), it indicates that a concatenation block is stored in the corresponding slot. On the other hand, if an empty block check EmptyBlkChk is set to '0' (step 520), it indicates that the corresponding slot is empty.

Address pointers are used to allocate and manage the HARQ internal memory 226 in units of slot. For example, exemplary embodiments of the present invention use two types of slot pointers for the address pointers. The slot pointers are managed by the address pointer manager 223.

Figure 6:
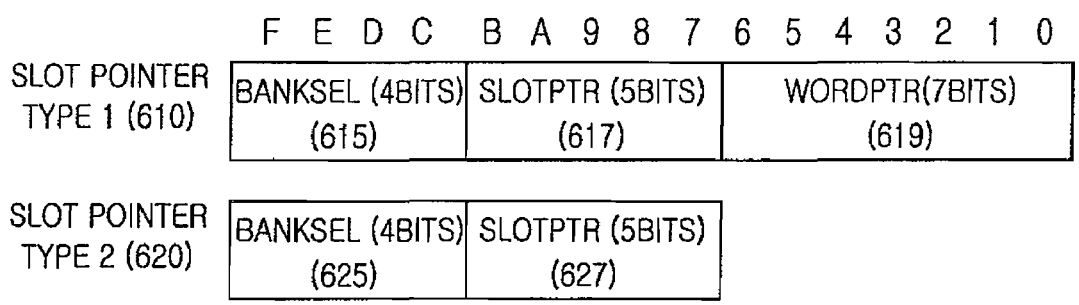
FIG. 6 illustrates slot pointers according to an exemplary embodiment of the present invention.

FIG. 6 illustrates slot pointers according to an exemplary embodiment of the present invention.

Referring to FIG. 6, a type 1 slot pointer 610 is 16 bits in length. The type 1 slot pointer 610 has the upper 4 bits 615 for selecting a memory bank, the next 5 bits 617 for selecting one of 32 slots in the memory bank, and the lower 7 bits 619 for indicating one word in one slot.

A type 2 slot pointer 620 is 9 bits in length. Unlike the type 1 slot pointer 610, the type 2 slot pointer 620 has the upper 4 bits 625 for selecting a memory bank, and the lower 5 bits 627 for selecting one of 32 slots in the memory bank.

For example, exemplary embodiments of the present invention use four types of address pointers. Specifically, an empty slot pointer ESPtr, an initial slot pointer ISPtr, a next slot pointer NSPtr, and a current sot pointer CSPtr.

The empty slot pointer ESPtr is used to indicate the location of the next empty slot. The initial slot pointer ISPtr is located in each ACID, and is used to indicate the memory address of a slot that stores the first concatenation block. The next slot pointer NSPtr is located in each ACID, and is used to indicate the memory address of a slot that stores a concatenation block next to a slot indicated by the current slot pointer CSPtr. The type 2 slot pointer 620 is used for the empty slot pointer ESPtr, the initial slot pointer ISPtr, and the next slot pointer NSPtr.

The current sot pointer CSPtr is located in each ACID, and is used to indicate the memory address of the current slot. The type 1 pointer 610 is used for the current slot pointer CSPtr.

Exemplary embodiments of the present invention clears the bitmap before the processing of the concatenation block. The reason for this is that information about data, which was processed in the previous stage, need not be retained any more. For the bitmap clear operation, exemplary embodiments of the present invention use 'Acid_Cir' to indicate a bitmap that need be cleared.

Figure 7:
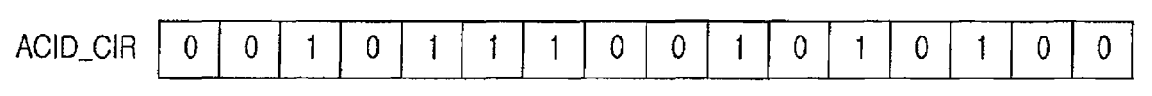

FIG. 7 illustrates slot bitmap clear conditions according to an exemplary embodiment of the present invention.

A clear condition for each channel is illustrated in FIG. 7. In FIG. 7, the leftmost portion is the first channel, the rightmost portion is the last channel, and a portion set to '1' is an ACID channel that need be cleared. A determination of the ACID channel may be made when an ACK signal is received and thus no more process is required.

Hereinafter, the overall operation of exemplary embodiments of the present invention will be described in detail.

Figure 8:
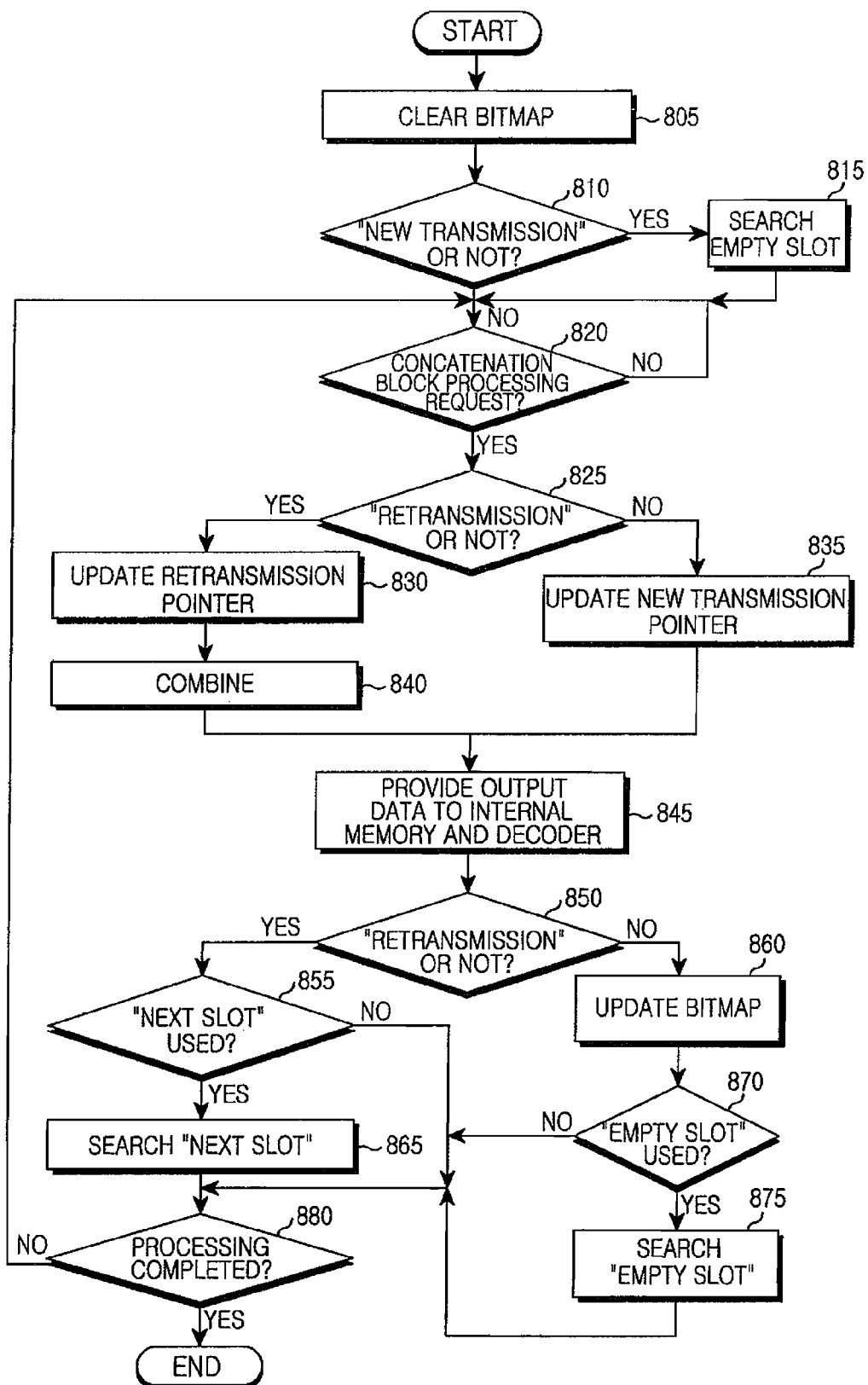
FIG. 8 is a flow diagram illustrating an operation of the HARQ memory control apparatus according to an exemplary embodiment of the present invention.

FIG. 8 is a flow diagram illustrating an operation of the HARQ memory control apparatus according to an exemplary embodiment of the present invention.

Referring to FIG. 8, if the HARQ controller 215 is ready in an idle state, it provides a ready signal to the slot bitmap manager 221. Then, in step 805, the slot bitmap manager 221 performs the bitmap clear operation illustrated in FIG. 7.

Thereafter, the HARQ controller 215 provides a control signal to the input data buffer 210, so that the input data buffer 210 outputs a concatenation block. In step 810, the HARQ controller 215 determines if the output concatenation block corresponds to 'new transmission' or 'retransmission', and provides the determination results to the HARQ combiner 220.

If the output concatenation block corresponds to 'new transmission' (in step 810), the operation proceeds to step 815 and step 820 sequentially; and if not (for example, 'retransmission'), the operation proceeds directly to step 820. In step 815, the HARQ combiner 220 receives, from the slot bitmap manager 221, information about which slot is empty.

In step 820, the HARQ combiner 220 determines if a request for processing of a concatenation block is received from the HARQ controller 215.

If the concatenation block processing request is received (in step 820), the operation proceeds to step 825; and if not, the operation repeats step 820.

In step 825, it is determined if the concatenation block corresponds to 'retransmission'.

If the concatenation block corresponds to 'retransmission' (in step 825), the operation proceeds to step 830 and 840 sequentially.

In step 830, a retransmission pointer is updated as follows: Because a concatenation block must be loaded from a memory address indicated by the current slot pointer, a memory address, which has been pre-stored after being received prior to the concatenation block, is allocated to the current slot pointer. For example, in the case of the first concatenation block, because a concatenation block must be loaded from a memory address indicated by the current slot pointer, a memory address indicated by the initial slot pointer is allocated to the current slot pointer.

In step 840, received data are combined with data pre-stored in the HARQ internal memory 226. The data combining process is performed in the multiplexer 222 under the control of the buffer controller 228. Thereafter, the operation proceeds to step 845 after the resulting data are temporarily stored in the HARQ output buffer 224.

On the other hand, if the concatenation block does not correspond to 'retransmission' (in step 825), the operation proceeds to step 835.

In step 835, a new transmission pointer is updated as follows: Because the concatenation block output from the input data buffer 210 must be stored in a slot indicated by an empty slot pointer (specifically, at a memory address of the slot indicated by the empty slot pointer), the memory address of the empty slot pointer is allocated to the current slot pointer.

Thereafter, the operation proceeds to step 845 after the corresponding data are temporarily stored in the HARQ output buffer 224.

In step 845, the data output in step 835 or 840 are provided to the HARQ internal memory 226 and the channel decoder 230. In case of 'new transmission', the concatenation block is stored at a memory address indicated by the empty slot searched in step 815. In case of 'retransmission', the concatenation block is stored at a prestored memory address.

In step 850, it is determined if the output in step 845 corresponds to 'retransmission'.

If the output in step 845 corresponds to 'retransmission' (in step 850), the operation proceeds to step 855. In step 855, it is determined if the 'next slot' is used.

If the 'next slot' is not used (in step 855), that is, if the current concatenation block is present only in a slot of a memory address indicated by the current slot pointer, the operation proceeds directly to step 880.

On the other hand, if the 'next slot' is used (in step 855), that is, if the current concatenation block is present in both of the next slot and a slot indicated by the current slot pointer, the operation proceeds to step 865. In step 865, the 'next slot' is searched. That is, a memory address indicated by the next slot pointer is updated to a slot following the two slots containing the concatenation block. Thereafter, the operation proceeds to step 880.

In step 880, it is determined if all the concatenation block processing is completed. If all the concatenation block processing is completed, the operation is ended; and if not, the operation returns to step 820.

On the other hand, if the output in step 845 does not correspond to 'retransmission' (in step 850), the operation proceeds to step 860. In step 860, the slot bitmap manager 221 updates a slot bitmap. That is, a bitmap for a memory address of a slot indicated by the current slot pointer is set to '1'.

In step 870, it is determined if an 'empty slot' is used. If an 'empty slot' is used (for example, if the current concatenation block is stored in both of the current slot and the next empty slot), the operation proceeds to step 875. In step 875, a memory address of the next slot (for example, the next empty slot) is allocated to the current slot pointer in order to process the next concatenation block. Thereafter, the operation proceeds to step 880.

On the other hand, if an 'empty slot' is not used (in step 870), the operation proceeds directly to step 880. Thereafter, the operation is ended.

The above-described exemplary embodiments may be recorded in computer-re adable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on, including a carrier wave transmitting signals specifying the program instructions, data structures, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, the present invention can reduce the required amount of memory by using a buffer efficiently. In particular, when a memory is embedded in an integrated circuit, the size and power consumption of the integrated circuit can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hybrid ARQ (HARQ) memory apparatus in a wireless communication system, comprising:
    a memory configured to partition the entire memory area in units of slots corresponding to the size of a concatenation block to input/output a plurality of channel data to the slot in units of the concatenation block, to store a new concatenation block in an empty slot, and to combine a retransmitted concatenation block with a pre-stored concatenation block and store the combined concatenation block at a pre-stored location;
    an address pointer manager for providing a memory address for access of channel data that are stored at a predetermined slot in the HARQ memory apparatus or at a predetermined word in the predetermined slot;
    a slot bitmap manager for determining if there are data at a predetermined slot in the HARQ memory apparatus; and
    a controller for determining if there are data at a predetermined slot from the slot bitmap manager and receiving the memory address from the address pointer manager, to perform data access for input/output of the channel data,
    wherein the address pointer manager comprises:
        a first slot pointer including a slot address pointer indicating a predetermined slot address and a word address pointer indicating a word address in the slot,
        a second slot pointer indicating a predetermined slot address,
        a third slot pointer that uses the first slot pointer, exists in each data channel, and indicates a memory address of a word in a slot where currently-accessed data are located,
        a fourth slot pointer that uses the second slot pointer and indicates a memory address of the next empty slot,
        a fifth slot pointer that uses the second slot pointer, exists in each data channel, and indicates a memory address of a slot where the first data are stored, and
        a sixth slot pointer that uses the second slot pointer, exists in each data channel, and indicates a memory address of a slot where currently-accessed data are stored next to a slot indicated by the third slot pointer.

2. The apparatus of claim 1, wherein the memory allocates a predetermined number of slots among a plurality of slots to one of a plurality of banks, and uses the bank and the slot as a memory partition identifier.

3. The apparatus of claim 2, further comprising:
    an address pointer manager for providing a memory address for access of channel data that are stored at a predetermined slot in the HARQ memory apparatus or at a predetermined word in the predetermined slot;
    a slot bitmap manager for determining if there are data at a predetermined slot in the HARQ memory apparatus; and
    a controller for determining if there are data at a predetermined slot from the slot bitmap manager and receiving the memory address from the address pointer manager, to perform data access for input/output of the channel data.

4. The apparatus of claim 3, wherein the address pointer manager comprises:
    a first slot pointer including a bank address pointer indicating a predetermined bank address, a slot address pointer indicating a slot address in the bank, and a word address pointer indicating a word address in the slot; and
    a second slot pointer including a bank address pointer indicating a predetermined bank address and indicating a slot address in the bank.

5. The apparatus of claim 4, wherein the address pointer manager further comprises:
    a third slot pointer that uses the first slot pointer, exists in each data channel, and indicates a memory address of a word in a slot where currently-accessed data are located;
    a fourth slot pointer that uses the second slot pointer and indicates a memory address of the next empty slot;
    a fifth slot pointer that uses the second slot pointer, exists in each data channel, and indicates a memory address of a slot where the first data are stored; and
    a sixth slot pointer that uses the second slot pointer, exists in each data channel, and indicates a memory address of a slot where currently-accessed data are stored next to a slot indicated by the third slot pointer.

6. The apparatus of claim 5, wherein the slot bitmap manager has a bitmap for each slot of the memory and indicates the existence or not of data of the internal memory slot in each bitmap.

7. The apparatus of claim 6, wherein, if input data of a predetermined channel are newly-transmitted data, the controller searches an empty slot from the slot bitmap manage, receives the fourth slot pointer memory address for the empty slot from the address pointer manager, allocates a memory address indicated by the fourth slot pointer to the third slot pointer of the predetermined channel, and stores the data at a memory address indicated by the third slot pointer.

8. The apparatus of claim 7, wherein, after storing the data at the memory address indicated by the third slot pointer, the controller controls the slot bitmap manager to set a bitmap corresponding to a slot where the data are stored, to update the bitmap, and allocates a memory address of a new empty slot to the fourth slot pointer if a new slot is additionally used for storage of the data.

9. The apparatus of claim 6, wherein if input data of a predetermined channel are retransmitted data, the controller receives a memory address of a slot, where previously-received data identical to the retransmitted data are located, from the address pointer manager, allocates the received memory address to the third slot pointer of the predetermined channel, and stores the data at a memory address indicated by the third slot pointer.

10. The apparatus of claim 9, wherein, after storing the data at the memory address indicated by the third slot pointer, the controller allocates a memory address of the next slot to the sixth slot pointer of the predetermined channel if the next slot is used for storage of the data.

11. The apparatus of claim 3, wherein if there is an order from the slot bitmap manager, the slot bitmap manager indicates the completion or not of a predetermined process for each data channel to perform a clear operation.

12. The apparatus of claim 1, wherein the slot bitmap manager has a bitmap for each slot of the memory and indicates whether data of the internal memory slot in each bitmap exists.

13. The apparatus of claim 12, wherein, if input data of a predetermined channel are newly-transmitted data, the controller searches an empty slot from the slot bitmap manage, receives the fourth slot pointer memory address for the empty slot from the address pointer manager, allocates a memory address indicated by the fourth slot pointer to the third slot pointer of the predetermined channel, and stores the data at a memory address indicated by the third slot pointer.

14. The apparatus of claim 13, wherein, after storing the data at the memory address indicated by the third slot pointer, the controller controls the slot bitmap manager to set a bitmap corresponding to a slot where the data are stored, to update the bitmap, and allocates a memory address of a new empty slot to the fourth slot pointer if a new slot is additionally used for storage of the data.

15. The apparatus of claim 12, wherein if input data of a predetermined channel are retransmitted data, the controller receives a memory address of a slot, where previously-received data identical to the retransmitted data are located, from the address pointer manager, allocates the received memory address to the third slot pointer of the predetermined channel, and stores the data at a memory address indicated by the third slot pointer.

16. The apparatus of claim 15, wherein, after storing the data at the memory address indicated by the third slot pointer, the controller allocates a memory address of the next slot to the sixth slot pointer of the predetermined channel if the next slot is used for storage of the data.

17. The apparatus of claim 1, wherein if there is an order from the slot bitmap manager, the slot bitmap manager indicates the completion or not of a predetermined process for each data channel to perform a clear operation.

18. A method for controlling a hybrid ARQ (HARQ) memory in a wireless access communication system, the method comprising:
   clearing a bitmap which indicating data existence in slots;
   determining if a received concatenation block is a newly-transmitted concatenation block or a retransmitted concatenation block;
   searching an empty slot if the received concatenation block is a newly-transmitted concatenation block;
   updating a current slot pointer to indicate the empty slot;
   storing the received concatenation block in the empty slot indicated by the current slot pointer;
   updating the bitmap to indicate change of data existence in slots;
   updating the current slot pointer if a new empty slot is used for the step of storing the received concatenation block;
   updating the current slot pointer if the received concatenation block is a retransmission concatenation block;
   combining the received concatenation block with a previously-received concatenation block identical to the received concatenation block;
   storing the combined concatenation block at a location where the previously-received concatenation block is stored; and
   updating a pointer indicating a next slot if the next slot is used for the step of storing the combined concatenation block.

19. The method of claim 18, further comprising the step of providing the stored concatenation block to a channel decoder after the step of storing the received concatenation block or after the step of storing the combined concatenation block.

20. The method of claim 18, wherein the step of updating the current slot pointer to indicate the empty slot comprises the step of updating a memory address of a pointer indicating the current slot to a memory address indicated by a pointer indicating the searched empty slot.

21. The method of claim 18, wherein, the step of updating the current slot pointer if a new empty slot is used for the step of storing the received concatenation block comprises the step of updating a memory address indicated by a pointer indicating the empty slot to a memory address of the new empty slot.

22. The method of claim 18, wherein the step of updating the bitmap comprises the step of setting a corresponding bitmap of a slot where the received concatenation block is stored, to indicate the use of the slot.

23. The method of claim 18, wherein the step of updating the current slot pointer if the received concatenation block is a retransmission concatenation block comprises the step of updating a memory address indicated by a pointer indicating the current slot to a memory address of a slot where the previously-received concatenation block identical to the received concatenation block is stored.

24. The method of claim 18, wherein the step of updating the pointer indicating the next slot comprises the step of updating a memory address indicated by a pointer indicating the next slot to a memory address of the next slot.

25. A non-transitory computer-readable medium having stored thereon executable instructions for controlling a hybrid ARQ (HARQ) memory in a broadband wireless access (BWA) communication system, the method comprising:
   a first set of instructions for clearing a bitmap which indicating data existence in slots;
   a second set of instructions determining if a received concatenation block is a newly-transmitted concatenation block or a retransmitted concatenation block;
   a third set of instructions for searching an empty slot if the received concatenation block is a newly-transmitted concatenation block;
   a fourth set of instructions for updating a current slot pointer to indicate the empty slot;
   a fifth set of instructions for storing the received concatenation block in the empty slot indicated by the current slot pointer;
   a sixth set of instructions for updating the bitmap to indicate change of data existence in slots;
   a seventh set of instructions for updating the current slot pointer if a new empty slot is used for the step of storing the received concatenation block;
   an eighth set of instructions for updating the current slot pointer if the received concatenation block is a retransmission concatenation block;
   a ninth set of instructions for combining the received concatenation block with a previously-received concatenation block identical to the received concatenation block;
   a tenth set of instructions for storing the combined concatenation block at a location where the previously-received concatenation block is stored; and
   an eleventh set of instructions for updating a pointer indicating a next slot if the next slot is used for the step of storing the combined concatenation block.

* * * * *